(12) United States Patent
Kerr

(10) Patent No.: US 7,160,148 B2
(45) Date of Patent: *Jan. 9, 2007

(54) CEILING FIXTURE WITH EASY INSTALLATION FEATURES

(75) Inventor: Jack Russell Kerr, College Station, TX (US)

(73) Assignee: Angelo Fan Brace Licensing, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/195,659

(22) Filed: Aug. 3, 2005

(65) Prior Publication Data

US 2005/0272306 A1 Dec. 8, 2005

Related U.S. Application Data

(63) Continuation-in-part of application No. 10/117,534, filed on Apr. 5, 2002, now Pat. No. 6,997,740, which is a continuation-in-part of application No. 09/636,779, filed on Aug. 16, 2000, now Pat. No. 6,464,524, which is a continuation of application No. 09/360,268, filed on Jul. 26, 1999, now Pat. No. 6,146,191, said application No. 10/117,534.

(60) Provisional application No. 60/299,635, filed on Jun. 20, 2001.

(51) Int. Cl.
*H01R 13/62* (2006.01)

(52) U.S. Cl. .................................................. 439/537
(58) Field of Classification Search ................ 439/537, 439/313, 318; 362/403, 404
See application file for complete search history.

(56) References Cited

U.S. PATENT DOCUMENTS

| | | | | | |
|---|---|---|---|---|---|
| 1,222,837 | A | * | 4/1917 | Winslow | 416/5 |
| 1,595,972 | A | * | 8/1926 | De Reamer | 439/313 |
| 1,639,125 | A | * | 8/1927 | Benjamin | 439/313 |
| 2,766,434 | A | * | 10/1956 | Gear | 439/529 |
| 3,356,840 | A | * | 12/1967 | Cohen | 174/54 |
| 5,505,632 | A | * | 4/1996 | Hayashi et al. | 439/318 |

FOREIGN PATENT DOCUMENTS

| | | | |
|---|---|---|---|
| DE | 19702395 | * | 7/1998 |
| GB | 2481 | * | 0/1908 |

* cited by examiner

*Primary Examiner*—Neil Abrams
(74) *Attorney, Agent, or Firm*—Joseph R. DelMaster, Jr.; Drinker Biddle & Reath LLP

(57) ABSTRACT

Various forms of ceiling fans with easy install features are disclosed. The fans include an electrical quick connect device. The quick connect device includes a plug/receptacle configuration in a rotatably mounted engagement enabling the fan to easily connect to an electricity supply while providing the gravitational and rotational support required by the fan. The ceiling fan side component may include sections that are slidably adjustable for use with different size fan bells.

20 Claims, 15 Drawing Sheets

CEILING FIXTURE WITH EASY INSTALLATION FEATURES

CROSS-REFERENCE TO RELATED APPLICATIONS

This application is a continuation of U.S. patent application Ser. No. 10/117,534 filed on Apr. 5, 2002, now U.S. Pat. No. 6,997,740, which is a continuation-in-part of U.S. patent application Ser. No. 09/639,779, filed Aug. 16, 2000, now U.S. Pat. No. 6,464,524, which is a continuation of U.S. patent application Ser. No. 09/360,268, filed Jul. 26, 1999, now U.S. Pat. No. 6,146,191. This application also claims benefit of U.S. provisional patent application No. 60/299,635, filed Jun. 20, 2001. All of those applications are herein incorporated in their entirety

FIELD OF THE INVENTION

The present invention is directed to the general field of ceiling fixtures, and to the more specific field of ceiling fans with features that make easier the tasks of hanging and electrically connecting the fan.

BACKGROUND OF THE INVENTION

The installation of a ceiling fan is a difficult task for a single installer. To install a conventional ceiling fan, the fan is lifted to just below the electrical junction box and held there while connecting the fan wires to the electrical supply wires. After the electrical connection is finished, the fan is lifted further to place the fan bell over the junction box and held in that position while the fan is attached to the box or a ceiling hanger in some manner, typically with screws or bolts. The combined operation takes several minutes and usually requires two persons, one to lift and hold the fan and the other to make the wire and screw connections.

SUMMARY OF THE INVENTION

The present invention provides an easily installed ceiling fan or other electrically-powered ceiling fixture. The fan includes a quick connect device for electrically and physically mounting the fan to a ceiling.

A quick connect device of the present invention includes a plate that is attachable to an electrical junction box and carries a first electrical contact. A canopy is attachable to the rim of the plate by rotation and is adapted to carry a ceiling fixture. A second electrical contact is mounted inside the canopy for connection with the first electrical contact. The first and second contacts are so positioned that they can be engaged before the rotational connection of the canopy to the plate. One of the electrical contacts is so mounted that it can rotate relative to the plate or the canopy, in order to allow for the rotational connection.

In a preferred embodiment, the plate is a receptacle plate that mounts onto an electrical junction box, and the first electrical contact is an electrical receptacle that can be connected to supply wires in the electrical junction box. The second electrical contact is an electrical plug of the type that mates with the receptacle, such as a three- or four-prong plug. The plug is rotatably mounted in the canopy and is connected to electrical conductors for supplying electricity to the electrically-powered components of the fixture, such as a fan motor, a light, and any fan accessories. The rim of the canopy is provided with L-shaped slots for a "bayonet" connection with studs or screws projecting from the rim of the plate. The quick connect device is so dimensioned that as the fan is raised, first the pins of the plug engage in their respective sockets in the receptacle. At this stage, the studs or screws on the plate need not be aligned with the L-shaped slots in the canopy. Then the rim of the canopy engages with the studs or screws on the plate. At this stage, the canopy can be rotated, while the pins of the plug remain engaged in the receptacle, so that the studs or screws can be brought into alignment with the mouths of the L-shaped slots. Then the fixture is raised further, the studs or screws enter the L-shaped slots, and the plug engages fully with the receptacle. The canopy is then rotated, so that the studs or screws enter the horizontal inner ends of the L-shaped slots. The studs or screws can then support the weight of the fixture, leaving the installer with both hands free to tighten those screws and/or insert other screws or fastenings to secure the canopy to the plate.

The plug need not be rotatably mounted, as long as the necessary freedom of rotation is provided somewhere. For practical reasons, the plate is preferably rigidly mounted to the ceiling box. However, the receptacle may be mounted for rotation on the plate. Instead, the plug may be non-rotatably mounted on the support, and the canopy may be rotatably mounted.

It is not necessary for every pin of the plug to engage in the receptacle before the screws or studs engage in the L-shaped slots. Secure engagement by one pin of the plug may be sufficient to maintain alignment between the plug and the receptacle. It is usually preferred for a ground or neutral pin to be the first pin to engage. Instead, a formation other than one of the pins and its socket may engage first.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim.

DETAILED DESCRIPTION OF THE INVENTION

Figure 1:
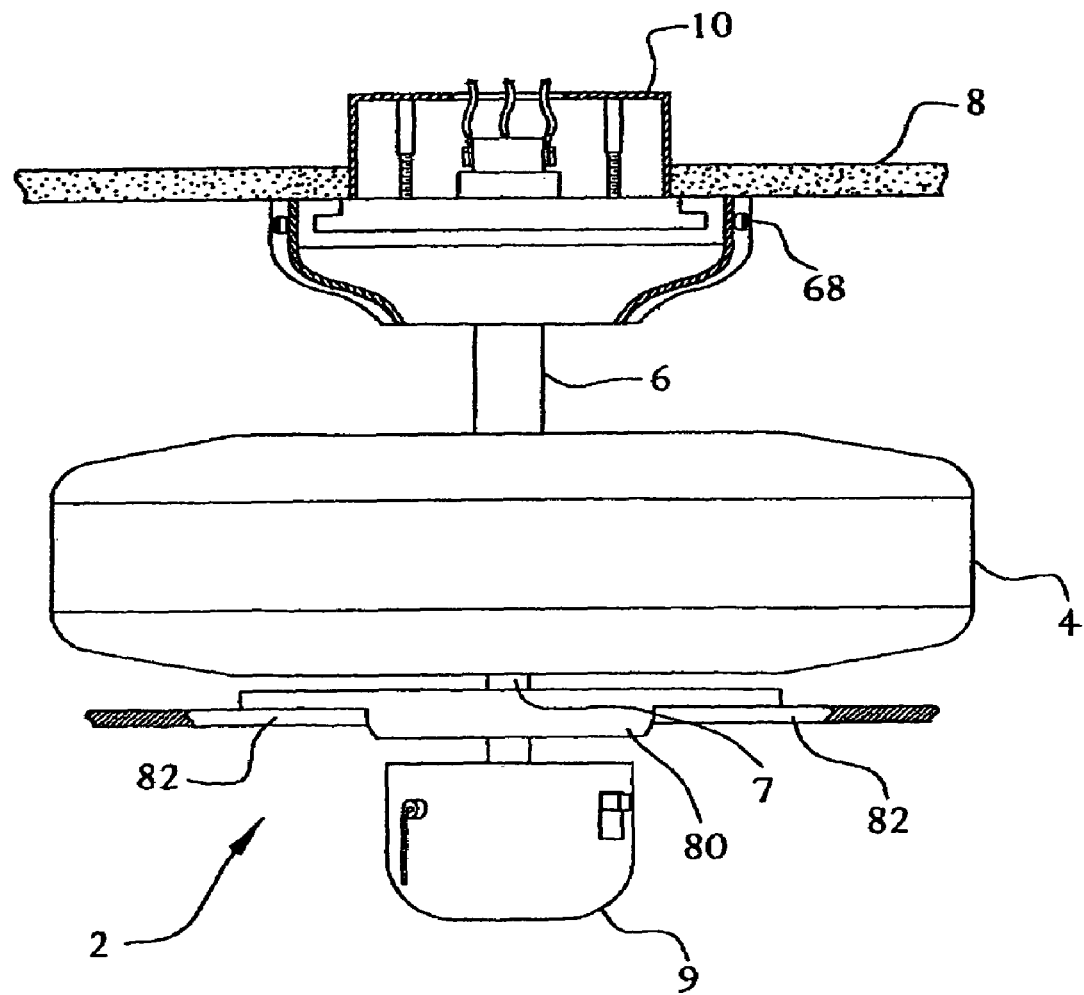
FIG. 1 is an elevation view of a ceiling fan according to the present invention.
Figure 2:
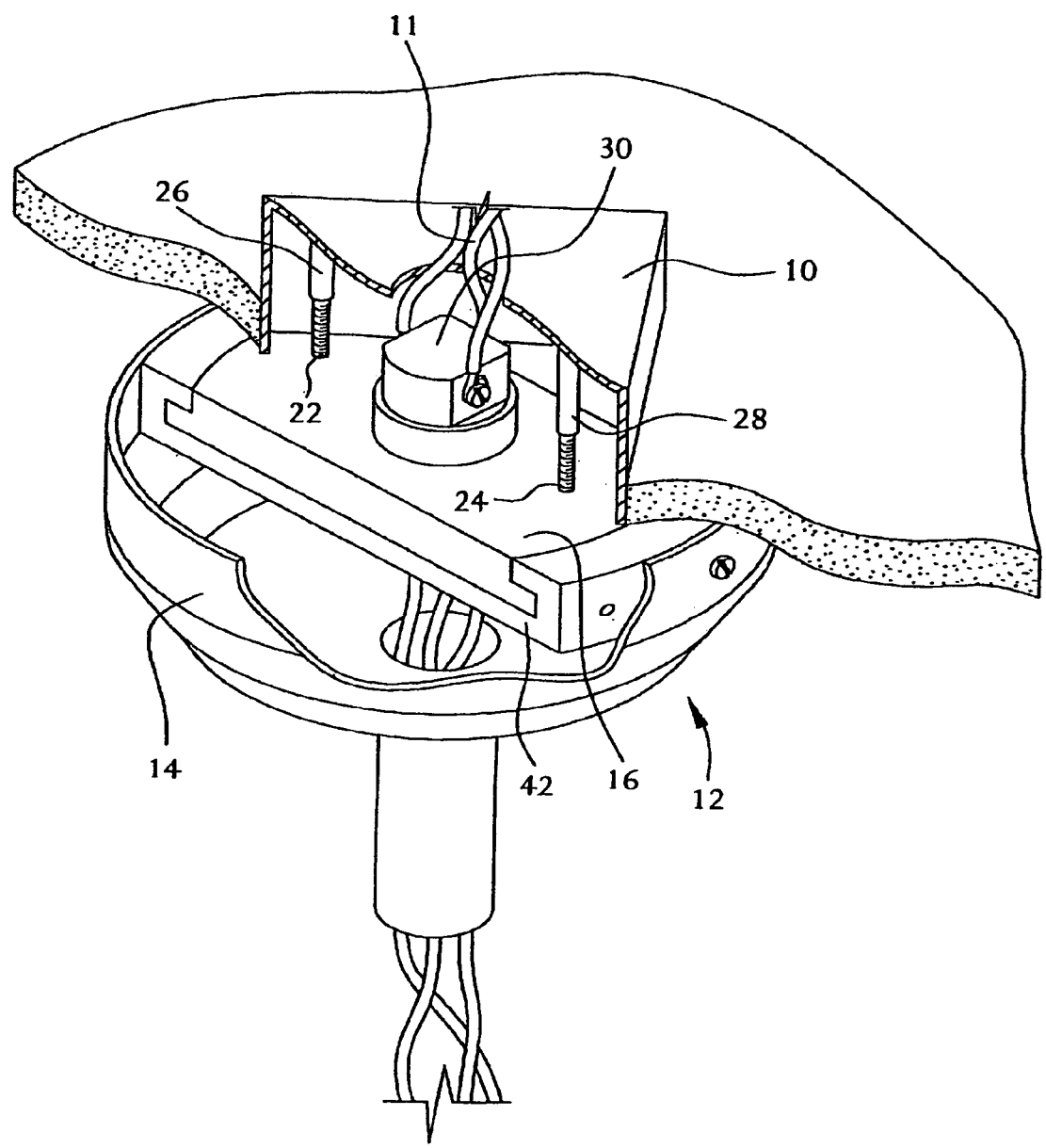
FIG. 2 is a perspective, partial section view of the quick connect device of the present invention.

Referring to the drawings, where like numerals indicate like elements, and initially to FIG. 1, a ceiling fan is generally indicated by the numeral 2. Many of the fan elements are conventional, the particular type or design of these conventional elements not being material to the invention. These conventional elements include a drive housing 4 that encloses a drive motor (not shown), a down rod connecting shaft 6 which provides a conduit for electrical wires, a drive shaft 7, a switch housing 9, and fan blades 82. In the interests of simplicity, the fans shown in the drawings are described as being mounted on the underside of a horizontal ceiling, with the connecting shaft 6 extending vertically downwards and the fan blades 82 rotating in a horizontal plane. It should be understood, however, that the invention is not limited to that orientation.

As shown in FIG. 1, an electrical junction box 10 is recessed in a ceiling 8. The junction box 10 is of the type that supports a ceiling fan and houses the electrical wires. A general characteristic of a ceiling fan junction box is that it has some type of reinforced screw receptacles, such as threaded metal blocks or threaded shoulder rivets, to receive screws attaching the fan to the box, and transmitting the weight of the fan to the box. U.S. Pat. Nos. 5,762,223 and 5,860,548, both to J. Russell Kerr, Jr., describe exemplary boxes of this type, and a box sold by Angelo Fan Brace, LLC. under the trade name SAF-T-BOX Model 1050 is an example of an electrical junction box that can be used with the present invention. The junction box 10 may be fastened directly to a ceiling joist, or may be mounted between joists on a hanger. A quick connect device indicated generally by the reference numeral 12 is used to connect the fan mechanically to the electrical box 10, and to connect the electrical supply wires to the fan, as described below.

Referring to FIGS. 2 to 11, one form of the quick connect device 12 includes a receptacle plate 16 that will attach to the electrical box 10. The receptacle plate 16 has two through holes 18, 20 to pass through two threaded screws 22, 24 that are received by internally threaded shoulder rivets 26, 28 fixed to the box 10 to attach the plate to the box. The screws 22, 24 and rivets 26, 28 secure the receptacle plate to the electrical box and provide adequate support and rigidity to sustain the weight and torque of a ceiling fan.

In an alternate embodiment, not shown but easily understood from the previous paragraph, the receptacle plate 16 has a pair of keyhole slots in place of the through holes. The screws 22, 24 are initially threaded part way into the rivets 26, 28, and the wide parts of the keyhole slots of the receptacle plate are aligned with the screws and passed over the heads of the screws. Thereafter, the receptacle plate 16 is rotated to move the screws into the narrow parts of the keyhole slots and the screws are tightened to secure the plate 16 to the box 10. Any configuration of the receptacle plate that provides the same function is contemplated as another possible alternative embodiment.

The receptacle plate 16 holds an electrical receptacle; as shown in FIGS. 1 to 11, it is a conventional three-prong receptacle 30. Electrical wires 11 within the ceiling are connected to the terminals of the receptacle 30 to supply electricity to the fan. The wires 11 form part of the ordinary wiring of the building in which the fan is installed: in the interests of conciseness, that wiring will not be further discussed.

Figure 3:
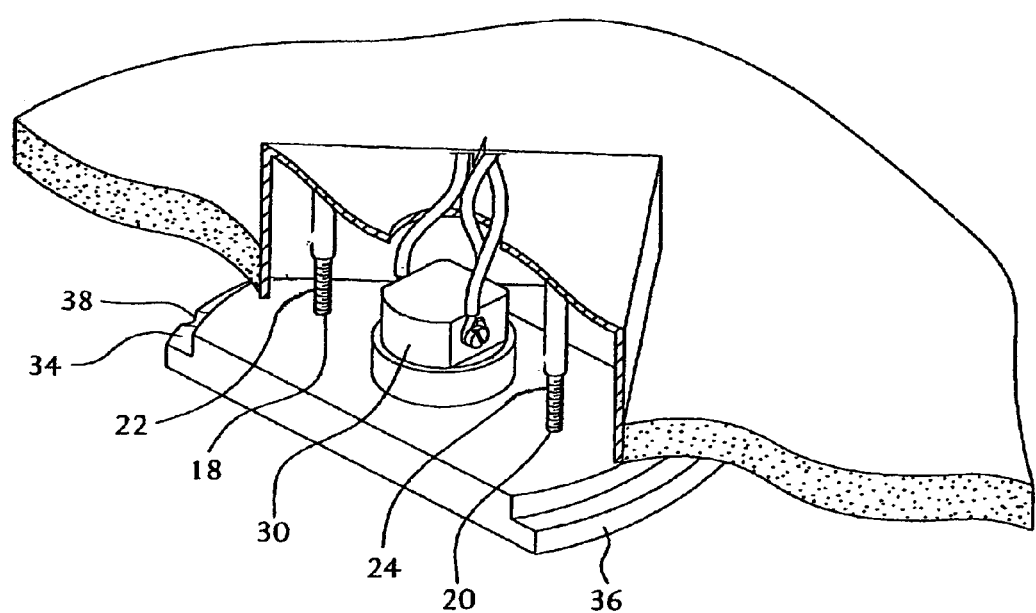
FIG. 3 is a perspective view of a receptacle plate of the quick connect device of FIG. 2.
Figure 4:
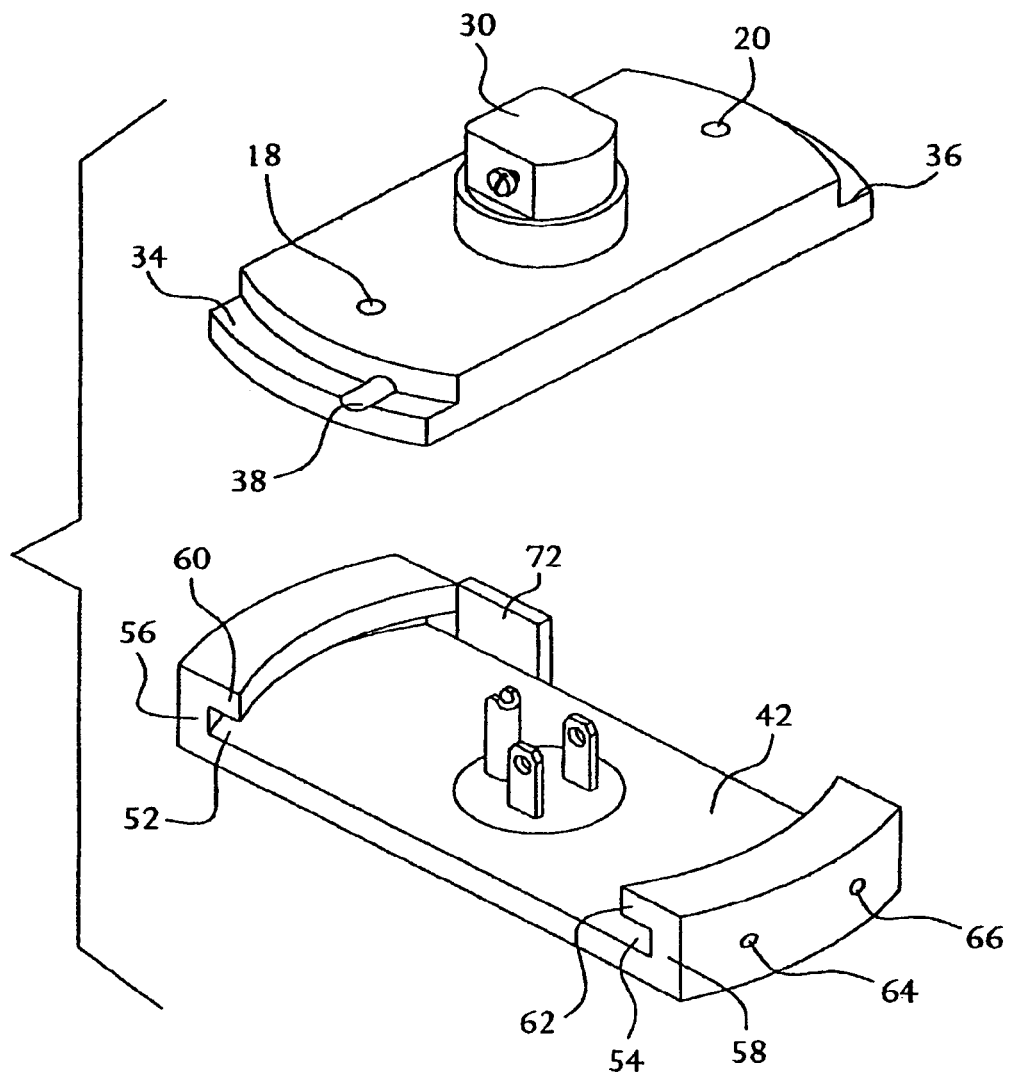
FIG. 4 is a exploded view of the quick connect device of FIG. 2.

Referring now to FIGS. 3 and 4, the receptacle plate has two opposite ends that are formed as arcs of a circle. The upwardly facing side of the receptacle plate 16 is cut back at each end of the plate to form a flange 34, 36 flush with the downwardly facing side of each end of the plate. A bore 38, 40 is drilled in the top surface of each of the flanges 34, 36 and extends into the main body of the receptacle plate, forming a cut-out in the flange and hollow cylindrical cavity in the main body, as shown in FIG. 4. The purpose of the bores is explained below.

Figure 7:
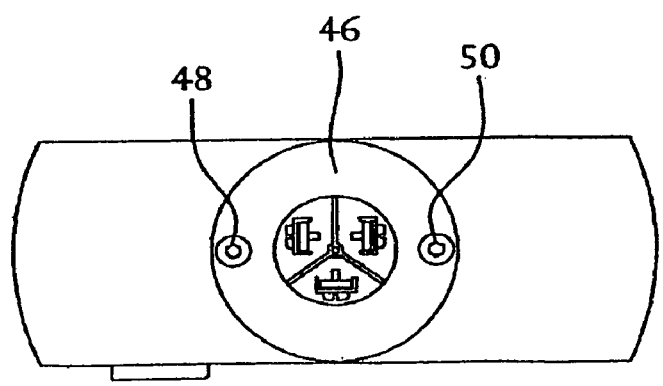
FIG. 7 is a bottom plan view of the plug plate of the quick connect device.
Figure 8:
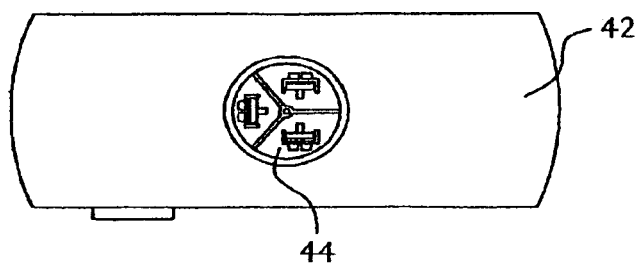
FIG. 8 is another bottom plan view of the plug plate of the quick connect device.
Figure 9:
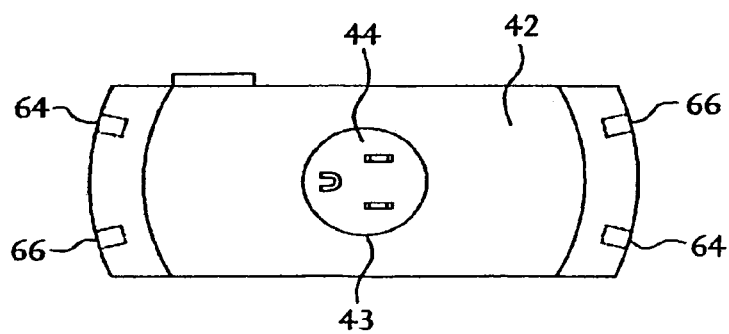
FIG. 9 is a top plan view of the plug plate of the quick connect device of the present invention.
Figure 10:
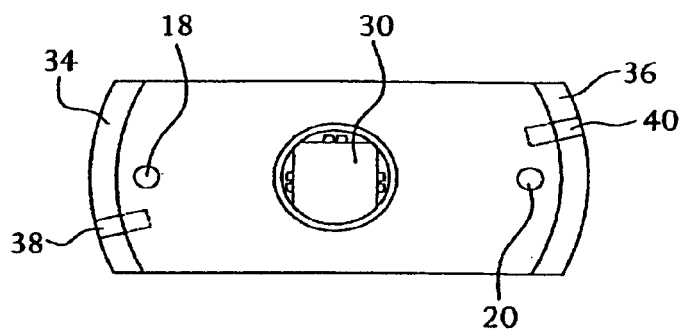
FIG. 10 is a top plan view of the receptacle plate of the quick connect device of the present invention.
Figure 11:
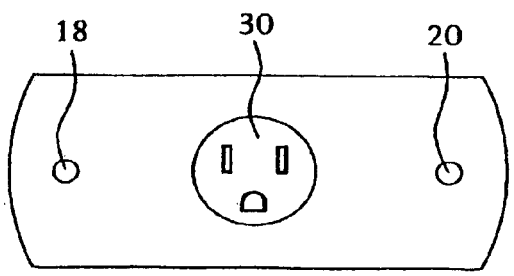
FIG. 11 is a bottom plan view of the receptacle plate of the quick connect device of the present invention.

Referring to FIGS. 4, 8 and 9, the quick connect device 12 also includes a plug plate 42 that will attach to the down rod connecting shaft 6, or to a bell or canopy 14 (see FIG. 2) that covers the connection between the down rod connecting shaft 6 and the ceiling box 12. The plug plate 42 holds a conventional cylindrical three-prong plug 44 that matches the receptacle 30. The plug 44 is secured to the plate 42 in a fashion that enables the plate to rotate around the plug (or the plug to rotate inside the plate). As shown in FIGS. 1 to 11, the plug plate 42 has a central chamber 43 to hold the cylindrical body of the plug. Most of the central chamber has a slightly larger diameter than the diameter of the plug, which enables the plug to rotate within the chamber. At the upwardly facing side of the plug plate 42, however, the chamber 43 is defined by a ridge. The ridge has a diameter slightly smaller than the diameter of the plug, and abuts the face of the plug and prevents the plug from being pulled out of the chamber from the upwardly facing side of the plug plate.

As shown in FIG. 7, a retaining ring 46 is attached to the downwardly facing side of the plug plate 42. The retaining ring 46 has a central opening through which electrical wires from the fan pass. The retaining ring 46 is fixed to the plug plate 42, in this embodiment by a pair of screws 48, 50. This configuration enables the plug plate to rotate relative to the plug about a vertical axis. The axis of rotation of the plug coincides with the central axis of the arcuate ends of the receptacle plate 16.

The ends of the plug plate are circular arcs, and at each end there is a latch slot 52, 54 defined by the end walls 56, 58 of the plate extending upwardly (as illustrated in FIG. 4) and reflecting back over the plate top walls 60, 62 extending inwardly from the end walls 56, 58. The latch slots 52, 54, are shaped and sized to receive the flanges 34, 36 of the receptacle plate. The flanges 34, 36 and the latch slots 52, 54 have coincident circular arcuate shapes so that the plug plate 42 and the receptacle plate 16 can rotate relative to one another with the flanges engaged in the latch slots. The flanges 34, 36 and the latch slots 52, 54 have circumferential extents substantially less than 90°, so that there is an orientation in which the flanges 34, 36 do not engage the top walls 60, 62. The axis of rotation of the plug plate 42 relative to the receptacle plate 16 coincides with the axis of rotation of the plug 44 relative to the plug plate 42.

Figure 6:
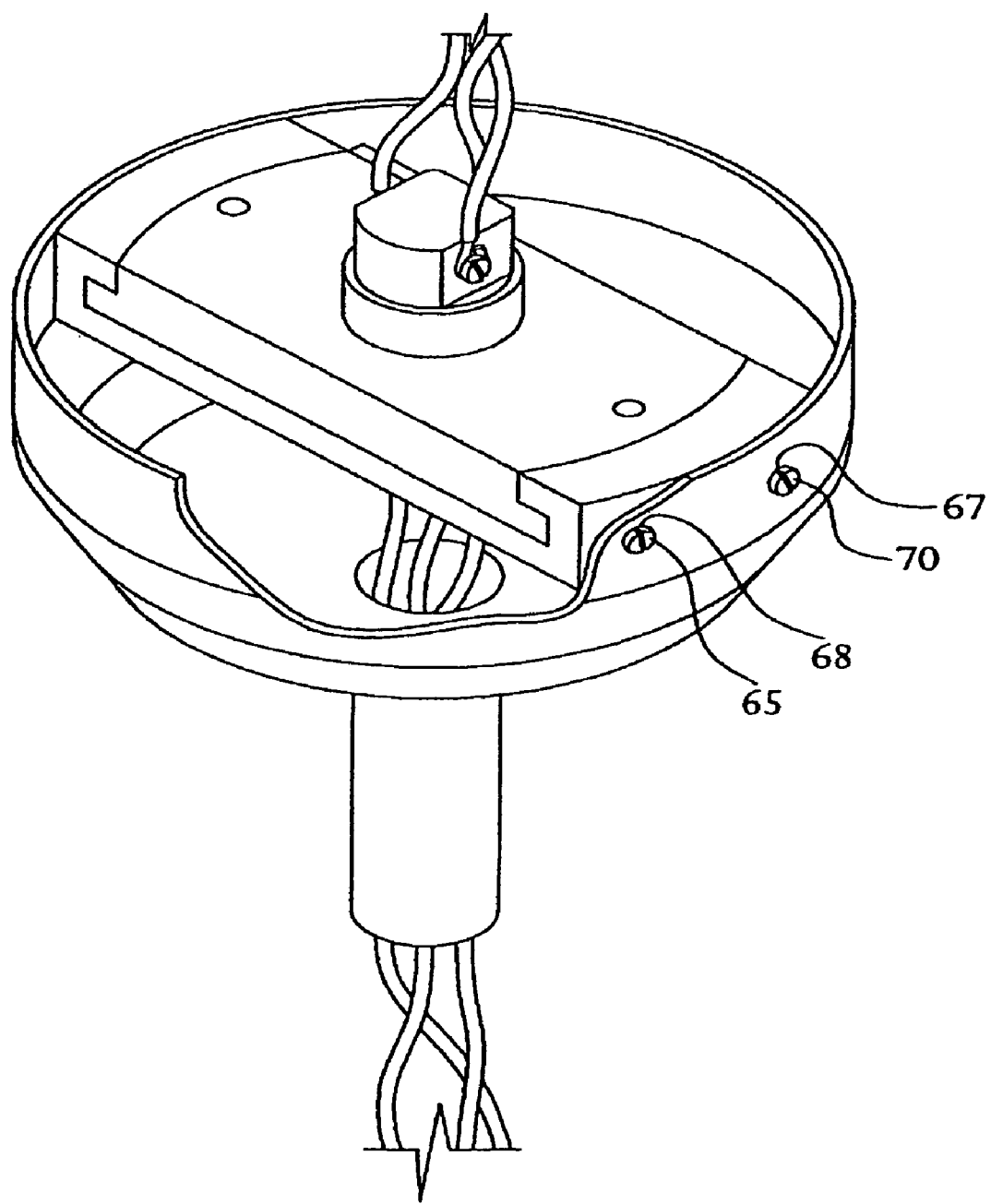
FIG. 6 is a perspective view of a quick connect device of the present invention attached to a ceiling fan bell.

The plug plate 42 has two pairs of screw holes 64, 66 to fasten the plug plate to the fan bell 14. Each pair of screw holes 64, 66 has one of the holes formed in each wall 56, 58. The individual holes of each pair of screw holes are positioned on opposite sides of the plug. The screw holes 66 continue as semi-cylindrical bores in the underside of the top walls 60, 62. As shown in FIG. 6, the fan bell 14 also has two pairs of screw holes 65, 67 that align with the screw holes 64, 66, respectively, of the plug plate 42 when the plug plate is properly positioned in the bell. A first pair of screw holes 65 receive screws 68 which extend through the fan bell and into the plug plate screw holes 64 and secure the plug plate in the fan bell, but do not project inwards from the plug plate 42. These screws are used to attach the bell 14 to the plug plate 42 before the fan is installed.

When the receptacle plate and the plug plate are rotated into their latched position (as shown in FIG. 6 and described below) the second set of plug plate screw holes 66 align with the bores 38, 40 in the receptacle plate 16. Once the two plates are aligned, the second set of screw holes 66 in the plug plate and the corresponding second set of screw holes 67 in the bell receive screws 70 which extend through the bell, through the end wall, into the receiving slot where they are received by the semi-cylindrical bores, and into the receptacle plate cylindrical cavities.

The plug plate may, and preferably will, include a stop 72 along one side of the receptacle plate to facilitate alignment of the plug plate and the receptacle plate, as described below.

The ceiling fan shown in FIGS. 1 to 11 is installed by the following steps. In a preferred embodiment the fan is expected to be sold with the plug plate 42 installed in the fan bell 14, and with the fan's electrical supply wires already connected to the proper terminals of the plug 44. The receptacle plate 16 will be included with the fan, but as an unattached item.

The first step is to connect the wires 11 from the electrical supply to the corresponding terminals of the receptacle 30 in the receptacle plate 16. The receptacle plate 16 is then attached to the electrical box 10 by the screws 22, 24.

Figure 5:
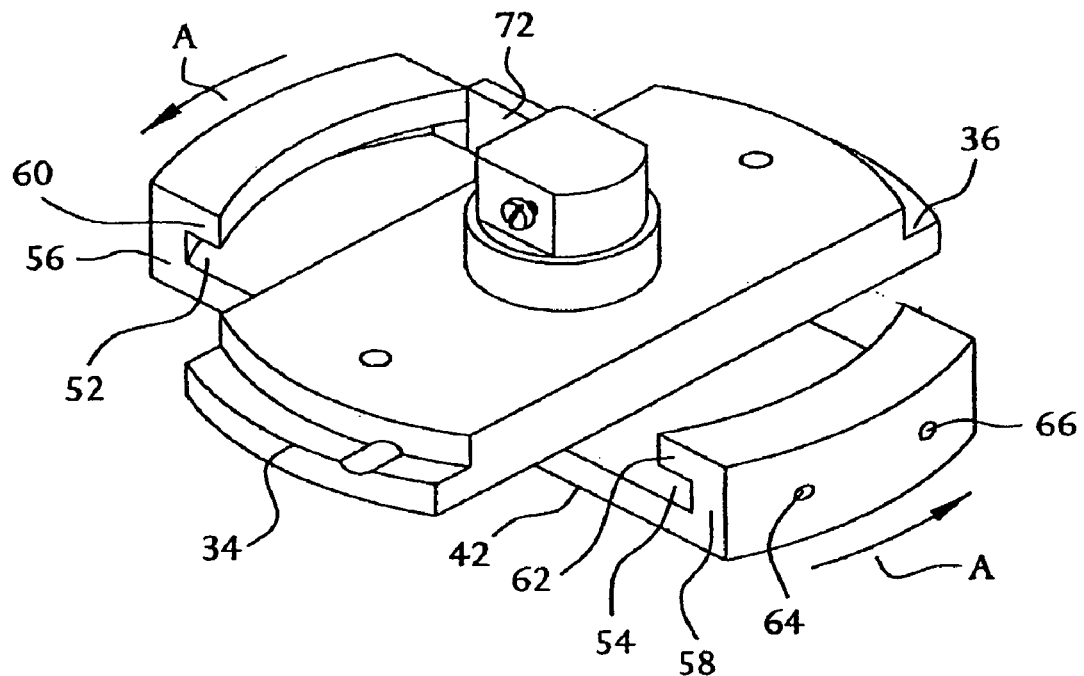
FIG. 5 is a perspective view of the quick connect device of FIG. 2 after initial engagement between the receptacle and plug.

Next, the fan is lifted to the junction box and the plug 44 is rotated to a position as in FIG. 5, where the plug can be inserted into the receptacle 30, while the plug plate 42 is across the receptacle plate 16 at a sufficient angle that the flanges 34, 36 of the receptacle plate do not contact the top wall 60, 62 of the plug plate. The fan is then raised to push the plug prongs fully into the receptacle. The fan is then rotated (as shown by arrow A in FIG. 5) to align and interlock the two plates, that is, to a position where the flanges 34, 36 on the receptacle plate are in the latch slots 52, 54 of the plug plate. If the plug plate has a stop 72, the fan is rotated until the receptacle plate contacts the stop, at which position the respective screw holes should be aligned. The screws 70 are then tightened to fix the receptacle plate to the plug plate. The screws 70 hold the plates securely together and prevent the plates from separating regardless of the direction of rotation of the fan blades.

Thus, the required time and difficulty of hanging and electrically connecting the fan is greatly reduced, and the operation can be easily done by one person.

The fan can be removed from the ceiling by reversing the sequence of installation described above. It will be appreciated that, as long as the fan removed is to be returned to its place, or is to be replaced by another fan having a similar plug 44 and plug plate 42, the receptacle plate 16 may be left in position. It is then not necessary to engage in any electrical wiring work. Further, because the plug and receptacle are automatically disconnected as the fan is removed from the ceiling, there is very little danger of electric shock even if the power supply to the wires 11 is not switched off. The fan should, of course, be switched off at the switch housing 9 before any attempt to remove or reinstall it.

Alternative embodiments of the quick connect device may be made by reversing some of the parts. For example, the plug 44 may be fixed relative to the plug plate 42 and the receptacle 30 may be rotatable in the receptacle plate 16. Any operable permutation of the plates and the rotatable plug/receptacle is considered to be within the scope of the present invention. Further, the preferred embodiment of the invention discloses a plug plate and a receptacle plate having a generally rectangular main body with curved ends, as illustrated, but the invention is not intended to be limited to that configuration.

Figure 12:
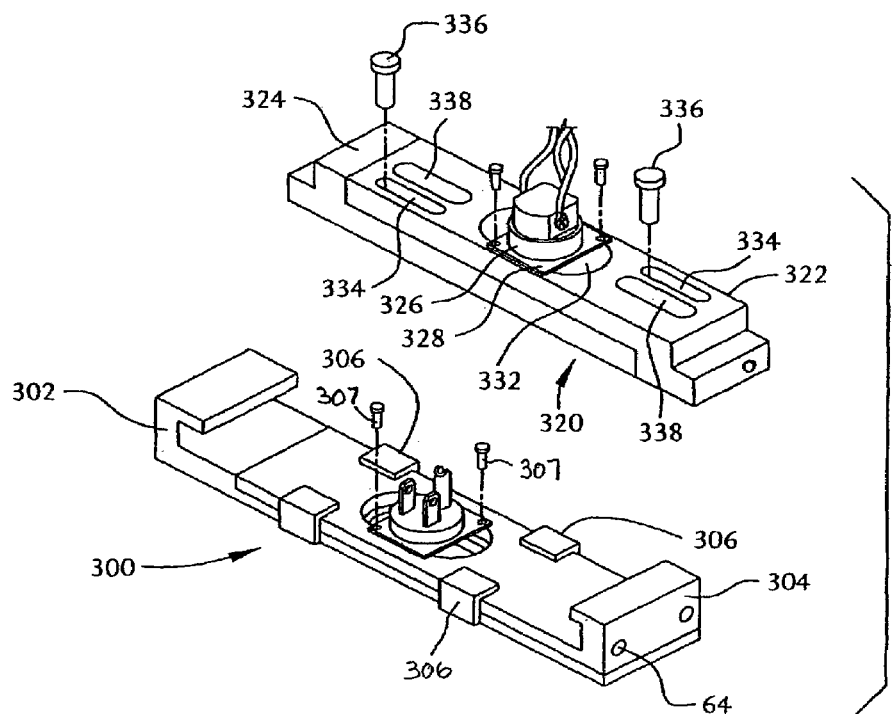
FIG. 12 is a perspective view of a first and a second plate of another embodiment of a quick connect device of the present invention.
Figure 13:
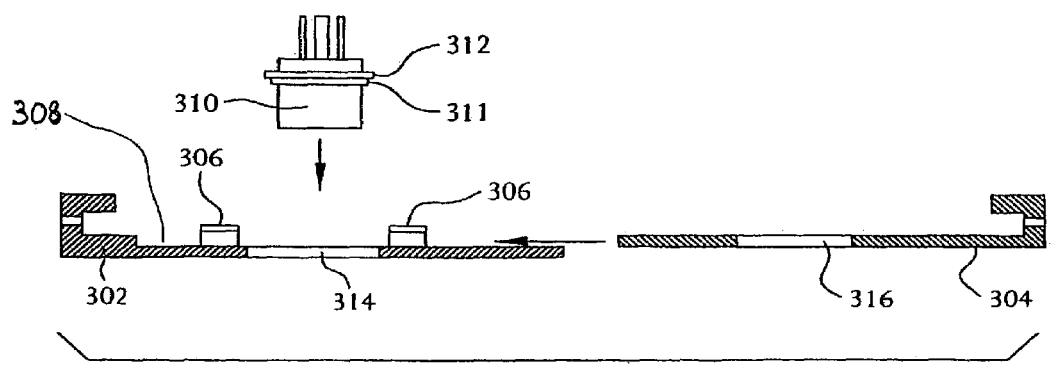
FIG. 13 is a side view of the second plate of the embodiment of FIG. 12.
Figure 14:
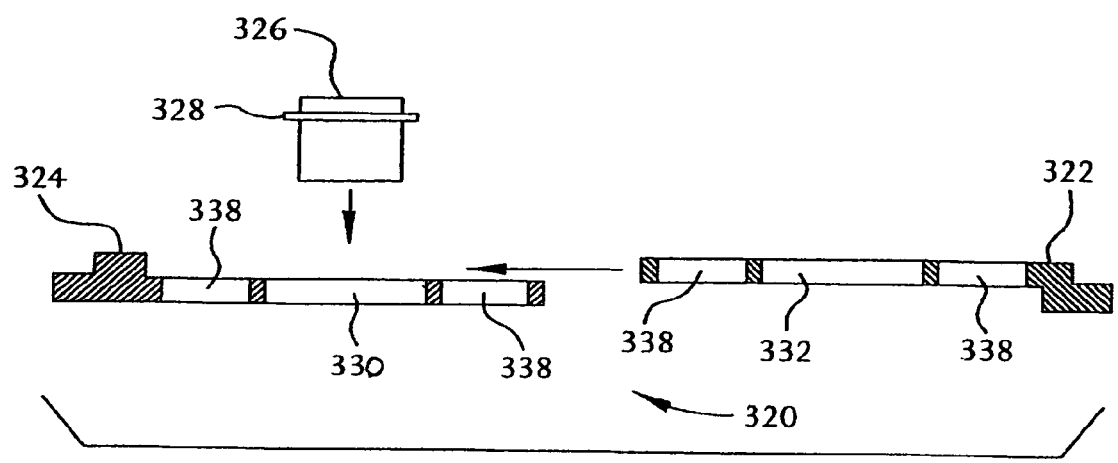
FIG. 14 is a side view of the first plate of the embodiment of FIG. 12.

FIGS. 12 and 13 illustrate how the embodiment of FIGS. 2–11 may be enhanced so that a single quick connect device can accommodate more than one size of fan bell. This feature would typically be used in quick connect devices that are retrofitted to existing ceiling fans. As illustrated, the second or plug plate 300 includes a bottom section 302 and a top section 304. A plurality of tabs 306 are attached to and extend from opposing sides of the bottom section 302. The bottom section 302 includes a cut out section 308 of reduced height. The top section 304 has a height that snugly fits into the cut-out section 308 as guided by the tabs 306.

This embodiment includes a plug 310 that has a collar 312 and a lip 311 positioned about the body of the plug. Both the bottom section 302 and the top section 304 include a central opening 314, 316, which may be rectangular or oblong. The central opening 314 of the bottom section 302 has a width generally equal to the diameter of the body of the plug 310, while the central opening 316 of the top section 304 has a width equal to the diameter of the lip 311. In this manner, the plug 310 resides within the central openings 314, 316 with the lip 311 resting on the bottom section 302 and the collar 312 resting on the top section 304.

Depending upon the size of the fan bell, the top and bottom sections 302, 304 may be pulled apart or pushed together. As the second plate 300 is fit into the fan bell, the first set of screws 68 may be inserted through the fan bell and into the receiving holes 64 to fix the second plate to the fan bell, as described above. Once the second plate 300 is fixed to the fan bell, the plug 310 can be adjusted to the center of the second plate, as allowed by the central openings 314, 316 and thereafter the collar 312 fixed to the top section 304 by a set of screws 307. The collar 312 is attached to the plug 310 in a manner that permits the second plate 300 to rotate about the plug 310.

The first or receptacle plate 320 includes a top section 322 and a bottom section 324. Each section 322, 324 includes a cut-out. When fully engaged, the two sections form a unit equivalent to the receptacle plate described above. This embodiment includes a receptacle 326 having a collar 328 thereabout. The receptacle 326 resides in an opening 330, 332 in each section 322, 324, respectively, with the collar 328 resting on the top section 324. Each receptacle plate section 322, 324 includes a first set of slots 334 that receive screws 336 for fixing the two sections 322, 324 to each other once the sections have been sized to correspond to the size of the plug plate sections 302, 304. Each receptacle plate section 322, 324 also includes a second set of slots 338 that receive screws (not shown) for attaching the receptacle plate to the electrical junction box once the sections 322, 324 have been sized and fixed to each other.

This embodiment is otherwise identical to the first embodiment described above with reference to FIGS. 2 to 11 in all material respects.

Figure 15:
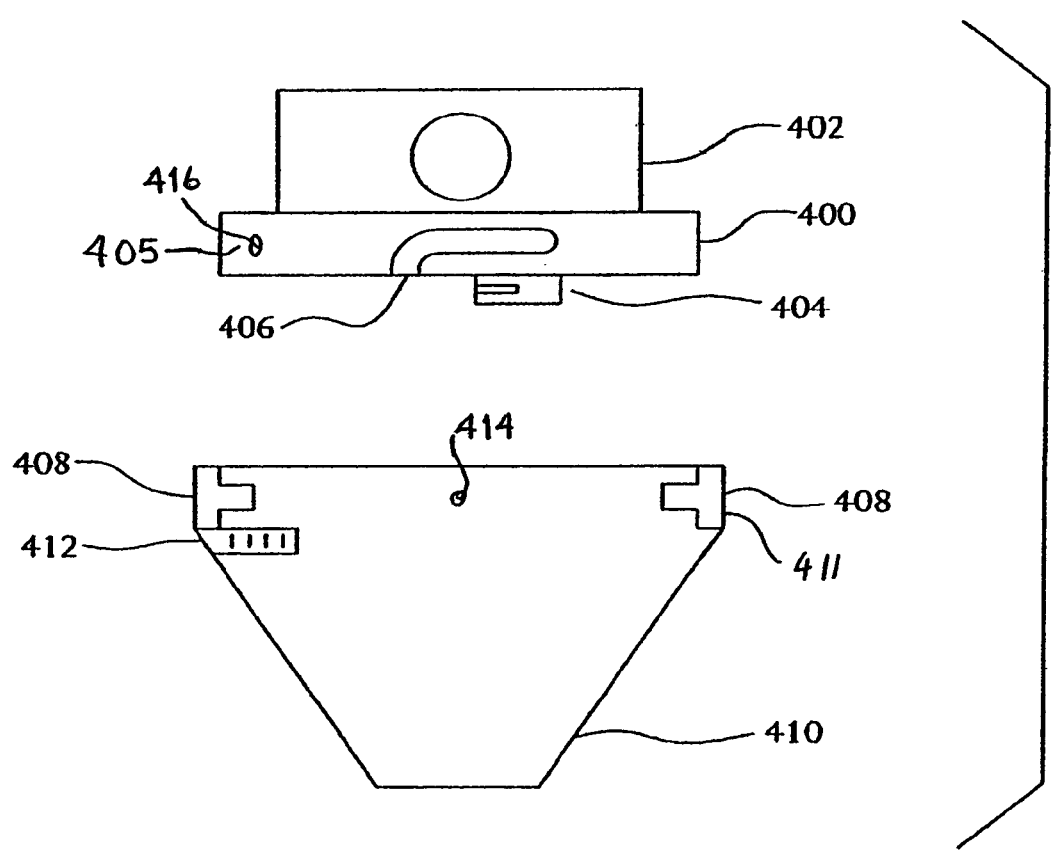
FIG. 15 is a side view of another embodiment of a quick connect device of the present invention.

FIG. 15 illustrates another alternate embodiment of the quick connect device. In this embodiment, the quick connect device includes a disk or "pancake box" 400 that is attachable to an electrical junction box 402 by screws 403 that engage in internally threaded shoulder rivets 26, 28 such as those shown in FIG. 2. The disk 400 carries a first electrical contact element 404. The first contact element 404 is wired to the electrical supply 11 in the junction box 402. The first contact element 404 may be either the plug or the receptacle of a plug/receptacle connection. Preferably, the first contact element 404 is the receptacle. Instead, the first contact element 404 may be a contact strip. The disk 400 has a flange 405 extending downwards from its rim. The flange 405 includes a pair of receiving slots 406 that are positioned on opposing sides of the disk 400. The slots 406 have a generally "L" shaped configuration. The mouths of the slots extend vertically downwards, and open out through the bottom edges of the flange 405. The closed ends of the slots extend horizontally.

The quick connect device also includes a pair of locking pins 408 mounted on the inside of a fan bell 410. The upper rim of the fan bell is formed by a vertical section 411 that is sized to fit over the flange 405 of the disk 400, snugly but not so tightly that the fan bell cannot be slid on and off and turned. The locking pins 408 are mounted on opposing sides of the fan bell 410, in positions corresponding to the receiving slots 406. A second contact element 412 is also mounted inside the fan bell 410. The second contact element 412 may be the other of the plug/receptacle connection or a second contact strip. The second contact element is positioned such that when the fan bell 410 is brought to the disk 400 bring the locking pins into the receiving slots 406 and the fan bell 410 is rotated to secure the locking pins 408 in the receiving slots 406, the second contact element 412 engages the first contact element 404. Once the fan bell 410 is mounted to the disk 400 a pair of set screws inserted into holes 414, 416 may be used to secure the fan bell 410 to the disk 400 to prevent rotational movement between the two.

Figure 16:
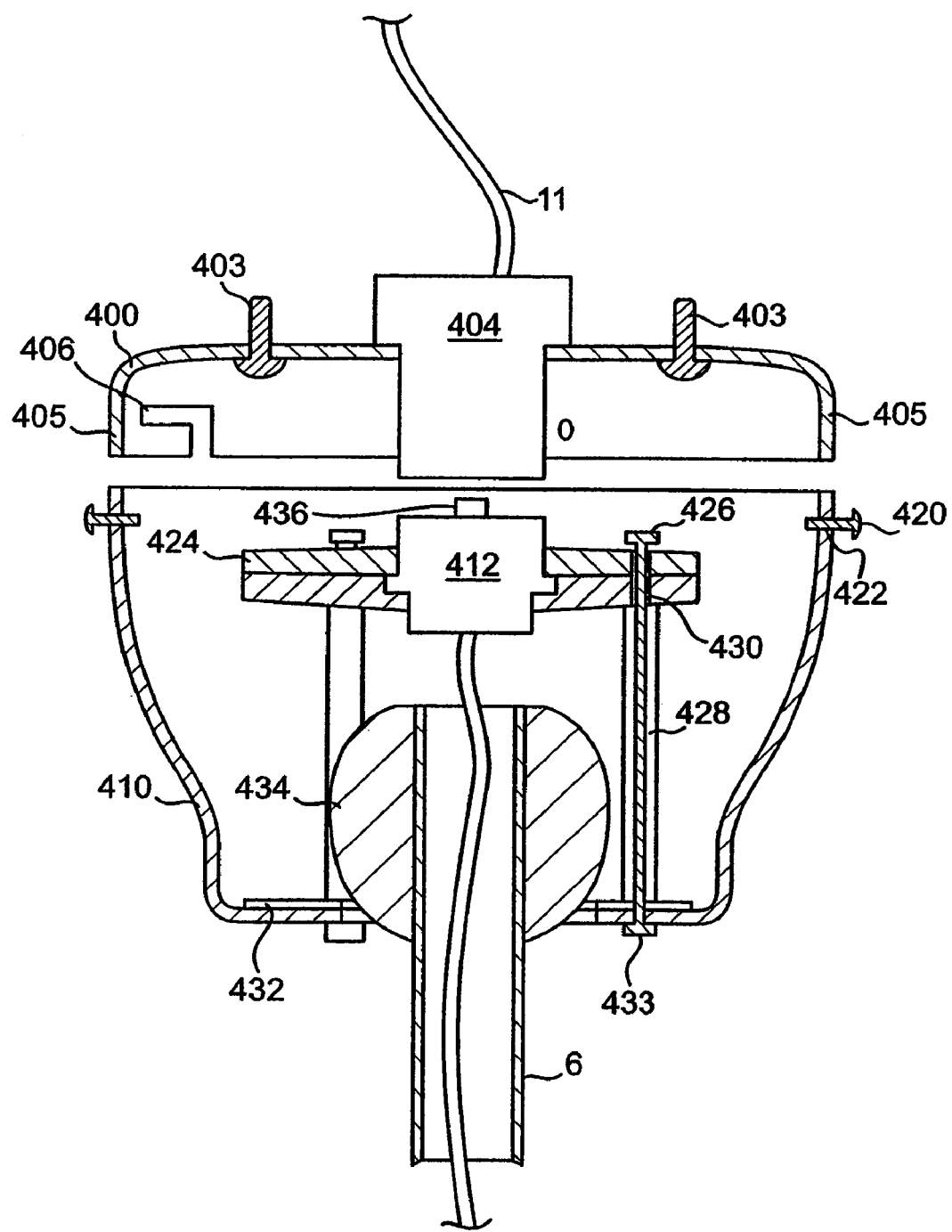
FIG. 16 is a side cross-section through a further embodiment of a quick connect device.

FIG. 16 illustrates a further alternate embodiment, which is similar to that shown in FIG. 15, except that the flange 405 on the pancake box 400 fits over the outside of the rim 411 of the bell 410. Instead of the pins 408, screws 420 are provided, which are threaded into holes 422 in the bell 410. As shown in FIG. 16, the second contact element 412 is a plug and the first contact element 404 is a receptacle. The receptacle 404 is fixed to the disk 400. The plug 412 is fixed to a disk 424, which is attached by screws 426 to internally threaded columns 428. The screws 426 pass through slots 430 in the disk 424, and are loosely tightened in order to allow the disk 424 to rotate through an arc determined by the length of the slots 430. The bottoms of the columns 428 are fixed to the bottom of the bell 410, and to a bearing ring 432 on the bottom of the bell by screws 433. The bearing ring 432 supports a ball 434, which carries the down rod connecting shaft 6. The ball 434 is keyed to the bearing ring 432, so that the fan can tilt in any direction, to accommodate ceilings that are not perfectly horizontal, but cannot revolve about the axis of the connecting shaft 6.

In order to mount the fan, the screws 420 are left very loose in their holes 422, so that a length of shank is exposed facing the flange 405 of the disk 400. The fan is raised and aligned so that the ground pin 436 of the plug 412 engages in its respective socket in the receptacle 404. The bell is then rotated, if necessary, until the screws 420 align with the mouths of the slots 406. The slots 430 allow the bell 410 to rotate to the correct position while the plug 412 remains in register with the socket 404. The fan is then raised, pushing the plug 412 into the receptacle 404, and the screws 420 into the slots 406. When the screws reach the angle of the slots 406, the plug 412 and socket 404 are fully engaged. The bell 410 is then turned, moving the screws 406 into the closed ends of the slots 406. The screws 420 then support the weight of the fan, and the installer can let the fan hang from those screws long enough to tighten them properly, and to insert additional screws into the holes 414, 416. The latter screws not only share the weight of the fan but also make it impossible for the bell to rotate and disengage the screws 420.

It will be understood that the mounting of the plug 412 on the rotatable plate 430 may be used not only with the mounting shown in FIG. 16, but with any of the other embodiments for which a rotatable second contact is appropriate. On the other hand, merely by shortening the slots 430 to round holes, or tightening the screws 426, the rotatable disk 424 and the plug 412 may be non-rotatably attached to the down rod connecting shaft 6. The screws 433 are then screwed directly into the bearing ring 433, with their heads inside the bell 410, so that the bell is rotatable relative to the bearing ring, the down rod connecting shaft 6, and the plug 412.

Figure 17:
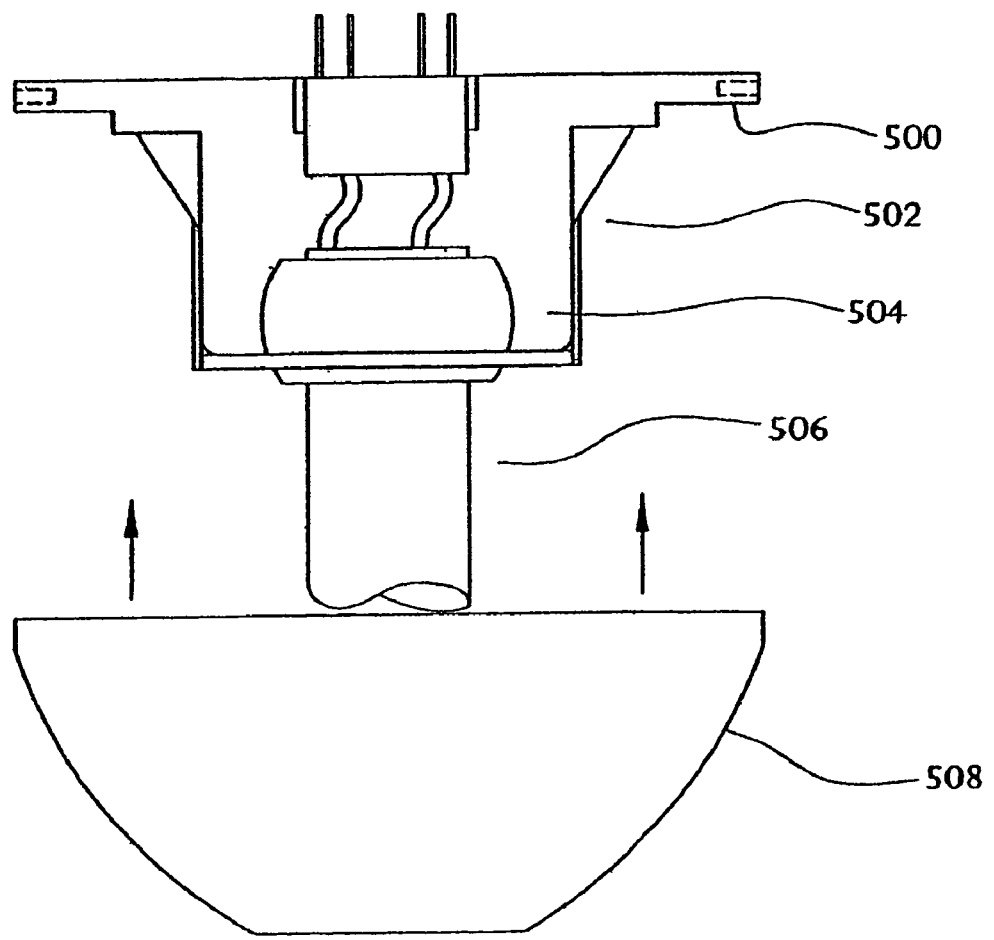
FIG. 17 is a side view of another embodiment of a quick connect device of the present invention.

FIG. 17 illustrates an alternate embodiment for connecting a plug plate 500 to the fan. A bracket 502 couples the plug plate 500 to a ball 504. The bracket 502 may be connected to the plug plate 500 or formed integrally therewith. The bracket 502 serves as a socket allowing the ball to rotate. A down rod 506 is connected to the ball 504. The down rod 506 connects to a motor housing (not shown). Once the ball 504 has been secured in the bracket 502, a fan bell 508 may be installed. The fan bell 508 may be attached to the plug plate 500, the electrical junction box or the ceiling. The bracket may also be used in conjunction with an embodiment incorporating contact strips.

Figure 18:
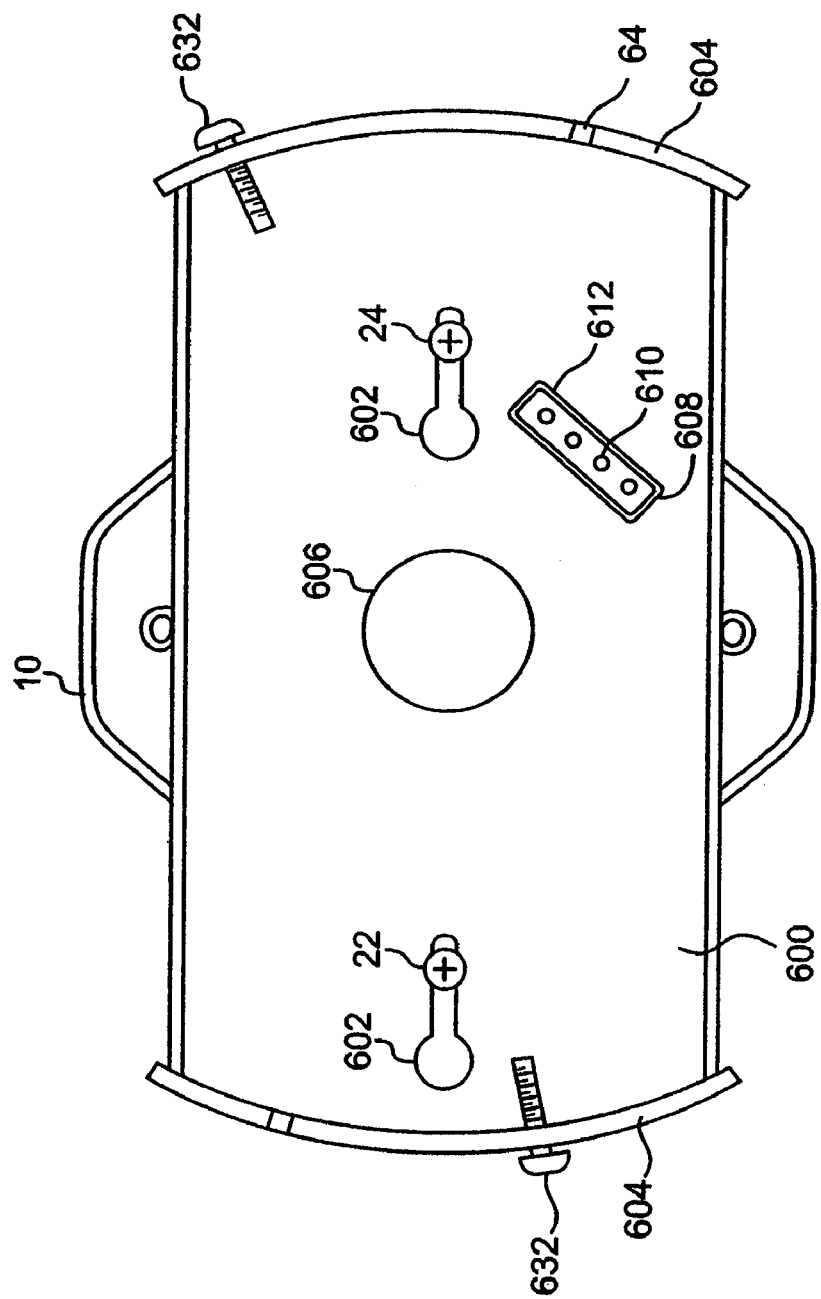
FIG. 18 is a bottom view of a connector plate of a further form of quick connect device mounted to an electrical box.
Figure 19:
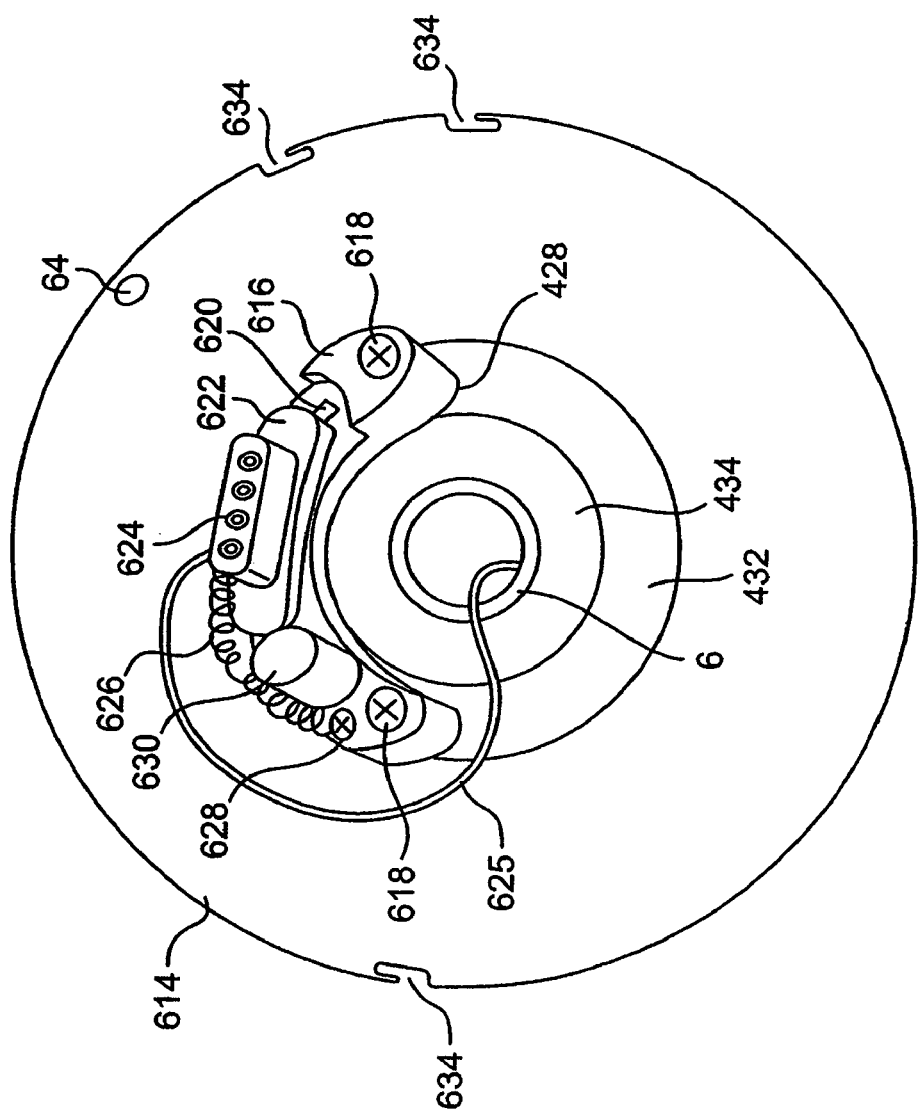
FIG. 19 is a top perspective picture of the bell of the quick connect device of FIG. 18.

Referring now to FIGS. 18 and 19, in a further embodiment of the quick connect mounting a plug plate 600 is attached to the electrical box 10 by screws 22, 24 that pass through keyhole slots 602 in the plug plate. At each end of the plug plate 600 is a flange 604 that extends downwards (away from the electrical box 10). The flanges 604 form two opposite sectors of a cylinder, corresponding to the rim 405 of the mountings shown in FIGS. 15 and 16. A hole 606 is provided in the center of the plug plate 600, in which a plug or socket could be mounted, similarly to the receptacles 30, 326, and 404 shown in previously described embodiments. In this embodiment, a plug 608 is mounted on the plug plate 600, away from the hole 606. The plug 608 has a row of contact pins 610, surrounded by an insulating or grounded shroud 612. The plug 608 passes through an opening in the plate 600, and the electrical wires 11 are connected to terminals on the part of the plug 608 above the plug plate 600. Instead, wires extending from the plug 608 may be connected within the junction box 10 to the "hot" wires 11.

Referring now to FIG. 19, the bell 614 carries a carrier ring 432, supporting a ball 434, which supports the connecting rod 6, as previously described. A mounting block 616 is fixed to one side of the carrier ring 432 by screws 618 screwed into posts 428. The mounting block 616 has an arcuate slot 620, centered on the axis of the bell 614. A receptacle plate or slider 622 is captive in the slot, and carries a receptacle 624 that matches the plug 608. It will be appreciated that the plug 608 and the receptacle 624 may be interchanged, or different sorts of plug and receptacle may be substituted. Wires 625 run from the receptacle 624 down the shaft 6 to the fan.

A spring 626 urges the slider 622 to one end of the slot 620. In this embodiment, the spring 626 is a coil spring in tension between the slider 622 and a screw 628 attached to the mounting block 616. The spring 626 is guided round an upstanding post 630 to improve its angle of action. Other forms of spring may be used instead, and it will be understood that a functionally equivalent spring may be provided in any of the embodiments of the invention described above.

Screws 632 are threaded into holes in the flanges 604, and L-shaped slots 634 are provided in the rim of the bell 614. As shown in FIG. 18, the screws 632 may not be diametrically opposite one another. This may be advantageous to remind the installer which way round to fit the bell onto the plug plate. It may be considered less esthetically pleasing to have the heads of the screws 632 asymmetrically positioned, but they should not be sufficiently conspicuous for that to be a problem. As shown in FIG. 19, more than two L-shaped slots 634 may be provided, for increased support or to allow a single design of bell 614 to fit different plates 600, pancake boxes 400, or the like.

To mount the fan, the installer raises the fan bell 614 above his head and aligns the screws 632 with the L-shaped slots 634 on the bell 614. An optional indicator on the fan bell 14 may also show the installer the proper fan bell alignment during installation. The spring 626 maintains the receptacle 624 in a position in which it is correctly aligned with the plug 608 when the screws 632 align with the slots 634. Next, the installer pushes the screws 632 into the slots 634 and rotates the bell so that the screws engage in the horizontal parts of the slots 634. When the bell is rotated, the receptacle plate 622 slides along the slot 620, allowing the receptacle 624, which is engaged with the plug 608, to remain fixed in position.

Figure 20:
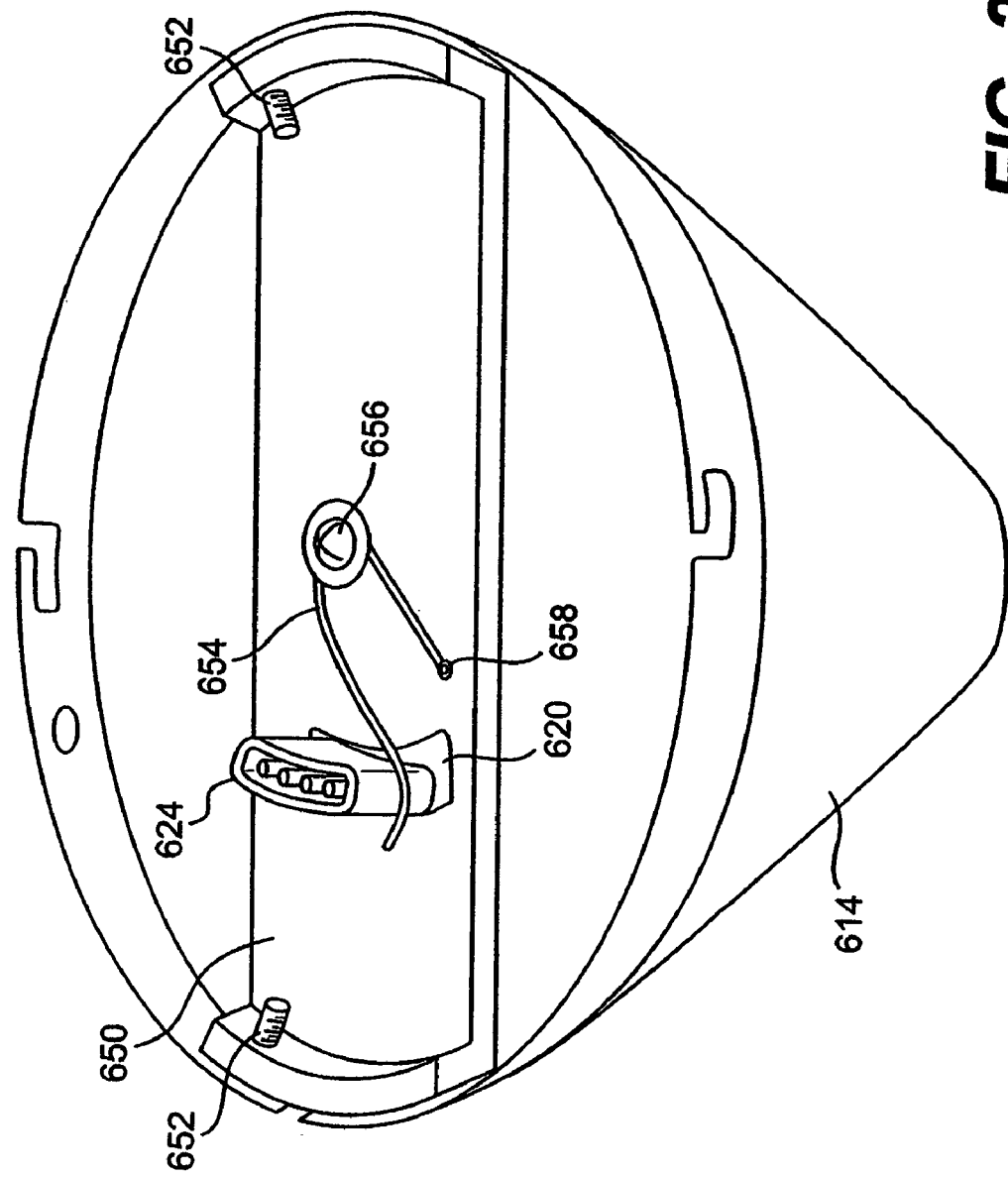
FIG. 20 is a perspective view from above of the plug plate and bell of an alternate embodiment.

An alternate embodiment is shown in FIG. 20. This embodiment is substantially similar to the embodiment shown in FIGS. 18 and 19, except that instead of the mounting block 616, a receptacle plate 650 extends across the bell 614, and is secured in position by screws 652 at both sides. The receptacle 624 slides in a slot 620 in the receptacle plate 650, and is biased to one end of the slot by a hairpin spring 654. The middle of the spring is pivoted round a screw 656, and the other end of the spring is held in a hole 658 in the receptacle plate. Installation is performed similarly to the embodiment shown in FIGS. 18 and 19.

The present invention may be embodied in other specific forms without departing from the spirit or essential attributes thereof and, accordingly, reference should be made to the appended claims, rather than to the foregoing specification, as indicating the scope of the invention. In particular, although the embodiments show specific combinations of features, it will be apparent to those skilled in the art how features from different embodiments may be combined and interchanged in various ways, only some of which have been specifically mentioned above.

For example, any of the embodiments described may be modified so that either the plug or the receptacle is attached to the ceiling box 10 and connected to the power supply 11 although, unless the pins of the plug are shrouded, it will usually be preferred to have the receptacle connected to the power supply. Any of the embodiments shown may be modified so that either the upper of the plug and receptacle can rotate relative to the ceiling box or the bell can rotate relative to the lower of the plug and receptacle. If the bell rotates relative to the lower of the plug and receptacle, the down rod connecting shaft 6 may be non-rotatably connected to either the bell or the structure holding the plug or receptacle. The weight of the fan may be carried either by the bell or by a structure inside the bell, as shown in FIG. 17. If the bell is not load-bearing, it may be a separate component that is positioned after the load-bearing and electrical connections have been made, or it may be attached to the lower part of the load-bearing connection during assembly.

Further, although the embodiments are described as mountings for a ceiling fan 2, it will be understood that other forms of fixture requiring both mechanical support and an electrical supply may easily be substituted.

The invention claimed is:

1. A quick connect device for a ceiling fixture, the device comprising:
   a first component attachable to an electrical junction box and including a first electrical connector and a flange at each end; and
   a second component attachable to an electrical fixture and including a second electrical connector, and a latch near each end suitable to receive the flange,
   wherein the first and second components are adapted to be coupled together by rotation to mount the electrical fixture releasably to the electrical junction box; and,
   wherein at least one of the first and second electrical connectors is rotatably mounted to the respective one of the first and second components; and
   wherein the first component further includes at least one bore in the flange, and wherein the second component further includes at least one hole in each end that aligns with said at least one bore to facilitate alignment of the first component and the second component.

2. The quick connect device of claim 1, wherein the flange at each end of the first component has an arcuate shape, and wherein the latch near each end of the second component has an arcuate shape.

3. The quick connect device of claim 1, wherein the connectors are arranged to be at least partly engaged before the said rotation, to remain non-rotatably engaged during the rotation, and to establish an electrical connection when the first and second components are coupled together.

4. The quick connect device of claim 1, wherein the second component further includes a stop to facilitate alignment of the first component and the second component.

5. The quick connect device of claim 1, wherein the axis of rotation of the first connector and the second connector coincides with the central axis of the ends of the first component.

6. The quick connect device of claim 1, wherein the second component is attachable to a bell of the ceiling fixture.

7. The quick connect device of claim 6, wherein the second component further comprises a top section and a bottom section that are adjustable in size to accommodate various sizes of the bell of the ceiling fixture.

8. The quick connect device of claim 7, wherein the first component further comprises a top section and a bottom section that are adjustable in size to accommodate various sizes of the second component.

9. A ceiling fixture assembly having a quick connect device and comprising:
   an electrically powered ceiling fixture;
   a first component adapted to be attached to an electrical junction box and containing a first electrical connector adapted to be connected to an electrical supply in the electrical junction box; and a second component adapted to be attached to the ceiling fixture and containing a second electrical connector adapted to be connected to an electrical feed to the ceiling fixture;

wherein the first component is rotatably couplable to the second component to mount the ceiling fixture to the electrical junction box, wherein at least one of the first and second electrical connectors is rotatably mounted to the first or second component, respectively, wherein the first and second electrical connectors are so disposed that they can be at least partly engaged before the first and second components are coupled together, remain engaged during the coupling of the first and second components, and are fully engaged so as to establish an electrical connection between the ceiling fixture and the electrical junction box when the first and second components are coupled together, and wherein a spring biasing said at least one of the first and second electrical connectors into a position where the connectors are aligned to be partly engaged when the first and second components are aligned for an axial movement; and wherein the first connector and the second connector are spaced from the axis of the rotation.

10. The ceiling fixture assembly of claim 9, wherein the coupling of the first and second components comprises an axial movement followed by a rotational movement, and wherein the connectors are arranged to be partly engaged before coupling of the first and second components, to remain partly engaged while permitting a rotation to align the first and second components for the said axial movement, to become fully engaged during the axial movement, and to remain fully engaged while permitting the rotational movement.

11. The ceiling fixture assembly of claim 9, wherein the second electrical connector is rotatably mounted in the second component.

12. The ceiling fixture assembly of claim 9, wherein the second component comprises a bell adapted to transmit the weight of the fixture to the first component, wherein the ceiling second electrical connector is rotatably mounted relative to the bell, and wherein the ceiling fixture is arranged to be non-rotatably connected to the bell.

13. The ceiling fixture assembly of claim 9, wherein the second component is attachable to a bell of the ceiling fixture.

14. The ceiling fixture assembly of claim 13, wherein the first and second components are adjustable to attach to a variety of bells.

15. A ceiling fixture assembly as in claim 9, further comprising a lock fixing the relative position of the first component to the second component.

16. The ceiling fixture assembly of claim 15, wherein the lock comprises a receiving hole in the first component, a through hole in the second component, and a locking rod insertable into the through hole and the receiving hole.

17. The ceiling fixture assembly of claim 9, wherein the first electrical contact is either a plug or a receptacle of a plug/receptacle electrical connection and the second electrical contact is the other of the plug/receptacle connection.

18. The ceiling fixture assembly of claim 17, wherein the first component contains the receptacle and the second component contains the plug.

19. The ceiling fixture assembly of claim 9, wherein the plug is rotatably contained in the second component.

20. A ceiling fixture assembly having a quick connect device and comprising:

an electrically powered ceiling fixture;

a first component adapted to be attached to an electrical junction box and containing a first electrical connector adapted to be connected to an electrical supply in the junction box; and a second component adapted to be attached to the fixture and containing a second electrical connector adapted to be connected to an electrical feed to the fixture; and wherein:

the first component is rotatably couplable to the second component to mount the fixture to the junction box;

at least one of the first and second electrical connectors is rotatably mounted to the first or second component, respectively; and the first and second electrical connectors are so disposed that they can be at least partly engaged before the first and second components are coupled together, remain engaged during the coupling of the first and second components, and are fully engaged so as to establish an electrical connection between the ceiling fixture and the electrical junction box when the first and second components are coupled together, wherein the second electrical connector is rotatably mounted in the second component, wherein the second component comprises a bell adapted to transmit the weight of the fixture to the first component, wherein the second electrical connector is rotatably mounted relative to the bell, and wherein the fixture is arranged to be non-rotatably connected to the second electrical connector; and wherein the first electrical connector and the second electrical connector are spaced from the axis of rotation.

* * * * *